Patented Feb. 6, 1951

2,540,314

UNITED STATES PATENT OFFICE 2,540,314

PROCESS AND COMPOSITIONS FOR APPLYING PHOSPHATE COATINGS

Paul Amundsen, Detroit, Mich., assignor, by mesne assignments, to Parker Rust Proof Company, Detroit, Mich., a corporation of Michigan No Drawing. Application July 24, 1947, Serial No. 763,457

10 Claims. (Cl. 148—6.15)

The invention relates to the art of treating metal surfaces in order to provide them with an adherent, substantially insoluble coating of phosphate, and more particularly relates to compositions and processes for producing corrosion resistant adherent phosphate coatings on ferrous metal surfaces.

Hitherto phosphate coating solutions have been prepared by dissolving various metals, oxides and salts such as the metal, oxide, or carbonate and normal phosphate of zinc or manganese in phosphoric acid and water so as to give a saturated solution of the metal dihydrogen phosphate. The phosphoric acid is used in only slight excess of the amount required to completely react with the metal or compound to give the dihydrogen phosphate. The concentrated solution of, for example, zinc dihydrogen phosphate is diluted with water to produce a 20 "point" solution (burette reading in titration of a 10 ml. sample of solution with .1 n NaOH with phenolphthalein and then heated for several hours. A change takes place, resulting in the formation of a sludge of zinc phosphate. The solution is then what is known as a balanced solution having a definite ratio of free acid to total acid of about 1 to 4 and pH of about 2.2. This solution is used indefinitely and load after load of work is run through it, the strength being maintained by additions from time to time of concentrated zinc dihydrogen phosphate solution.

As is well known, the phosphate coating solutions which have hitherto been used contain sludge which is formed by hydrolysis during the heating of the solution, and which also builds up during the coating process. There are two types of sludge present in the phosphate coating baths hitherto used. One type is the zinc or manganese phosphate sludge resulting from heating the solution after the concentrated zinc or manganese dihydrogen phosphate is dissolved in the bath, and the other type is an iron phosphate that is precipitated after considerable iron is dissolved in the bath from the work being treated. As a result, for example, in a zinc dihydrogen phosphate coating bath the sluge will be a mixture of zinc phosphate and iron phosphate, mostly zinc phosphate when the bath is fairly new and mostly iron phosphate after the bath has been used for a considerable length of time.

An object of this invention is to provide an economically feasible phosphate coating process using sludge free solutions.

Another object is to provide a concentrated phosphate coating composition which after dilution and heating will be free from sludge and useable in a commercially practical sludge free phosphate coating process.

A further object is to provide an improved and less expensive phosphate coating solution, and a process for using such solution.

A further object is to provide a zinc dihydrogen phosphate solution which will not form a sludge, the solution having a pH of above 2.2 and such that it would normally form a sludge on heating without the addition of the chloride radical.

Another object is to provide a phosphate coating solution which will remain sludge free even when the iron content of the bath exceeds 4 grams per liter of solution.

Other objects and advantages of the invention will become apparent as the following detailed description progresses.

In accordance with this invention ferrous metal objects such as steel bolts and nuts are immersed in an aqueous solution comprising zinc dihydrogen phosphate, phosphoric acid, water, and a soluble chloride having a cation other than zinc, preferably a cation of the group consisting of divalent cations of the iron group, alkali metal and ammonium cations, alkaline earth metal including magnesium cations, cadmium cations, and mixtures thereof, the chloride radical corresponding to the said cation being present in at least 1 gram of chloride per 10 grams of zinc dihydrogen phosphate, and the solution having a free acid to total acid ratio of between 1:3.5 and 1:20 and a hydrogen ion concentration to give a pH value of between 1.5 and 4.0. The total phosphate for practical coatings should be present in at least .003 mol per liter of solution and the zinc in at least .001 mol per liter. The upper limits of phosphate and zinc are set by the solubility limit of the zinc phosphate compounds in solution and the ratio of free acid to total acid. Preferably the solution also contains dissolved zinc chloride, and the chloride radical content of the solution then should be present in an amount greater than the amount required to combine with the zinc chloride, such excess chloride radical being present in solution in at least 1 gram of chloride per 10 grams of zinc dihydrogen phosphate.

The excess chloride radical may be supplied by any soluble chloride compound other than zinc chloride, and may be supplied, for example, by introducing ferrous chloride into the solution. The ferrous chloride may be introduced by adding the ferrous chloride salt to a zinc dihydrogen phosphate bath, or it may be introduced through the action of an acidic zinc dihydrogen phosphate solution containing zinc chloride on ferrous metal objects, the excess chloride by this action being allowed to build up to a suitable amount and being maintained in this suitable amount by the withdrawal of portions of the used solutions and the replacement with new zinc dihydrogen phosphate zinc chloride solution.

Where the cation corresponding to the excess chloride radical is ferrous iron or other cations which form insoluble phosphates, the concentration of such salts should be maintained at below the concentration at which the phosphates precipitate from the solution in order to obtain a sludge free bath. However, in the presence of a chloride radical in an amount over and above that required for zinc chloride when zinc chloride is present, these cations remain in solution at a much higher concentration than they would if such excess chloride were not present. For example, iron phosphate sludge in the absence of a chloride radical, normally precipitates from a zinc dihydrogen solution when the iron content reaches from 4 to 6 grams per liter of solution. In the presence of excess chloride radicals, iron will stay in the zinc dihydrogen phosphate solution at 8 grams per liter of iron and even higher.

This inhibiting effect of the chloride radical, particularly on the formation of zinc phosphate and iron phosphate sludges, is believed to be due to the formation of soluble complex chloride phosphate compounds. The reason that zinc chloride is not effective by itself is believed to be due to the common ion effect of the zinc of the zinc chloride with the zinc of the zinc dihydrogen phosphate. Thus zinc chloride in the absence of other chloride radicals will itself form zinc phosphate precipitates during a run of ferrous metal objects in a solution of zinc dihydrogen phosphate and zinc chloride. However, when excess chloride radical is present in the bath, such as may be supplied by ferrous chloride, the zinc chloride may be present and sludge free runs may be made when the excess chloride is present in at least 1 gram of chloride per 10 grams of zinc dihydrogen phosphate.

It is preferred to use zinc chloride in the zinc dihydrogen phosphate solution rather than other zinc salts such as zinc sulphate and zinc nitrate since the zinc chloride during a run with ferrous metal objects will provide excess chloride ions as some of the zinc is used on the work and some of the iron of the work goes into solution. Thus by proper regulation of the iron concentration as above stated sufficient excess chloride ions can be supplied. Other zinc salts such as zinc sulphate and zinc nitrate may be used with the zinc dihydrogen phosphate but in such cases soluble chloride compounds in sufficient amount must be added to the solution. Likewise where zinc dihydrogen phosphate is used as the only zinc salt, the soluble chloride compounds must be added to the solution.

For obtaining an exceptionally adherent, highly resistant, rustproof coating the addition of manganous chloride has been found particularly satisfactory. The chloride ion of the manganous salt provides the supply of chloride and the manganese cation to some extent forms a manganous phosphate which deposits on the work in combination with the zinc phosphate.

Cobaltous chloride and nickelous chloride give similar results to ferrous chloride.

It is not necessary to use an acid salt. Satisfactory results have been obtained with potassium, sodium, ammonium, calcium, and magnesium chlorides. In order to obtain effective results these compounds likewise must be used in an amount so as to provide at least 1 gram of chloride per 10 grams of zinc dihydrogen phosphate. The potassium, sodium and ammonium chlorides may be used in high concentration since these cations do not form insoluble phosphates. Amounts up to 1 gram of chloride per gram of zinc dihydrogen phosphate, and even higher proportions of chloride, are suitable. With such chlorides the upper limit of chloride is limited only to the solubility of the salt in the bath and the type of coating desired. As the chloride radical content increases the coatings become thinner. With certain objects such as cast iron objects satisfactory rust resistant coatings may be obtained in 1 gram of chloride per gram of zinc dihydrogen phosphate, but with other objects, such as those made of alloy steels, the chloride content should be substantially lower, such as 1 to 5, to obtain commercially satisfactory rustproofing, although for rust resistant coatings for some purposes higher concentrations of the chloride radical may be used. In the case of chlorides whose cations form insoluble phosphates, it is generally desirable not to exceed the soluble limit of the phosphate compounds. With chlorides in their higher oxidation state, such as ferric chloride, the solubility limit is too low to introduce sufficient chloride ion without introducing excessive amounts of hydrochloric acid, and therefore such materials are not desirable although they may be used to provide chloride ion with hydrochloric acid. Hydrogen chloride or hydrochloric acid may be used to supply chloride ion, but it has the disadvantage of introducing acid into the bath and therefore is not preferred. However, by replacing some of the phosphoric acid in the bath with hydrochloric acid the acidity may be kept at a free acid of below .2 N. and a free acid to total acid ratio of 1:4 and less, and thus it is possible to use hydrogen chloride to supply chloride ion in my process.

My invention of using excess chloride ions is particularly useful for producing low acid sludge free solutions, and for processing work in such low acid sludge free solutions I prefer to use solutions having a ratio of free acid to total acid of between 1 to 5 and 1 to 10. I prefer that the pH of these solutions should exceed 2.2, preferably between 2.2 and 3.0. The following table shows how I may produce phosphate coating solutions having a pH of above 2.2 and which are sludge free.

Table 1

| Acidulated zinc dihydrogen phosphate (ml./L) | Grams per liter Salt other than zinc dehydrogen phosphate | pH zinc dihydrogen phosphate solution @ 70° F. | pH zinc dihydrogen phosphate solution plus salt @ 70° F. | pH at boiling point | pH cooled to 70° F. | Comments on sludge |
|---|---|---|---|---|---|---|
| 20 | none | 2.48 | | 1.93 | 2.15 | Heavy zinc phosphate. |
| 20 | 20KCl | 2.48 | 2.38 | 2.00 | 2.45 | Light zinc phosphate. |
| 20 | 30KCl | 2.45 | 2.35 | 2.19 | 2.45 | None. |
| 20 | 40KCl | 2.36 | 2.36 | 2.14 | 2.46 | Do. |
| 20 | 20ZnCl$_2$ | 2.48 | 2.31 | 1.61 | 1.94 | Heavy zinc phosphate. |
| 20 | 30ZnCl$_2$ | 2.47 | 2.40 | | 1.94 | Do. |
| 20 | 40ZnCl$_2$ | 2.48 | 2.45 | 1.64 | 1.89 | Do. |
| 20 | 180ZnCl$_2$ | | | | 2.15 | Do. |
| 20 | 86Na$_2$SO$_4$.10H$_2$O | 2.48 | 2.65 | 2.22 | 2.27 | Do. |
| 20 | 172Na$_2$SO$_4$.10H$_2$O | 2.47 | 2.65 | | | Do. |
| 20 | 344Na$_2$SO$_4$.10H$_2$O | 2.48 | 2.80 | 2.18 | 2.28 | Do. |
| 20 | 44NaNO$_3$ | 2.48 | 2.28 | | 2.05 | Do. |
| 20 | 90NaNO$_2$ | 2.46 | 2.13 | | | Do. |
| 20 | 32NaCl | 2.48 | 2.25 | | 2.28 | None. |
| 20 | 70BaCl$_2$.5H$_2$O | 2.48 | 2.24 | | 1.97 | Heavy barium phosphate. |
| 20 | 56FeCl$_2$.4H$_2$O | 2.48 | 2.15 | | 2.13 | Heavy green ferrous phosphate. |
| 20 | 10FeCl$_2$.4H$_2$O | 2.48 | | | | None. |
| 20 | 6FeCl$_2$.4H$_2$O | 2.48 | 2.40 | 2.16 | 2.40 | Do. |
| 20 | 2FeCl$_2$.4H$_2$O | 2.48 | 2.46 | 2.10 | 2.30 | White fluffy. |
| 20 | 58MgCl$_2$ | 2.48 | 2.20 | | 2.18 | None. |
| 20 | 56MnCl$_2$.6H$_2$O | 2.48 | 2.09 | | 2.10 | Do. |
| 20 | 20CoCl$_2$.6H$_2$O | 2.48 | 2.36 | 1.86 | 2.16 | Heavy red cobaltous phosphate. |
| 20 | 20NiCl$_2$.7H$_2$O | 2.48 | 2.40 | 2.10 | 2.38 | None. |
| 20 | 12CoCl$_2$.6H$_2$O | 2.48 | | | | Do. |
| 20 | 30CaCl$_2$ | 2.48 | 2.30 | 2.01 | 2.25 | Do. |
| 20 | 10CaCl$_2$ | 2.48 | 2.34 | 1.85 | 2.14 | Slight. |
| 20 | 10NaF | 2.48 | 4.12 | 3.80 | 3.80 | Fluffy white. |
| 20 | 42CdCl$_3$.2½H$_2$O | 2.49 | 2.16 | 1.81 | 2.10 | None. |
| 20 | 30AlCl$_3$.6H$_2$O | 2.44 | 1.19 | .7 | 1.23 | Do. |
| 20 | 96KBr | 2.36 | 2.36 | 2.14 | 2.46 | Do. |

It is seen from the above table that the addition of chloride ions to a zinc dihydrogen phosphate solution when such chloride ions are not used in too small amount and are not used in an amount such as to form a precipitate of the phosphate of the cation used, will prevent the formation of sludge, the exception as hereinabove pointed out being zinc chloride which has a common ion effect.

The following examples are given to illustrate the invention:

Example I

The following ingredients in the parts by weight indicated were dissolved to form a concentrated solution of zinc dihydrogen phosphate, phosphoric acid, and ferrous chloride:

ZnO _____ 11
H$_3$PO$_4$ (75% by weight) _____ 48
ZnCl$_2$ _____ 6
FeCl$_2$ _____ 5
Water to balance _____ 30

The above solution is sold to the processor and is diluted by him with water to form a 4% by weight solution. It gives a satisfactory rustproof coating on ferrous metal objects and by adding more of the said concentrated solution from time to time to maintain the acidity constant the solution can be used over and over until the iron content of the solution reaches about 8 grams of iron per liter of solution.

Example II

The following ingredients in the parts by weight indicated were dissolved to form a zinc dihydrogen phosphate solution containing phosphoric acid and manganous chloride:

ZnO _____ 11
H$_3$PO$_4$ (75% by weight) _____ 48
MnCl$_2$ 6H$_2$O _____ 16
Water _____ 25

This solution is likewise diluted with water to 4% and gives a highly resistant manganese phosphate, zinc phosphate, rustproof coating on ferrous metal objects such as iron and steel bolts and nuts. It gives a satisfactory rustproof coating on ferrous metal objects and by replenishing as in Example I the solution can be used over and over until the iron content of the solution reaches about 8 grams of iron per liter of solution.

Example III

The following ingredients in the parts by weight indicated were dissolved to form a solution of zinc dihydrogen phosphate, phosphoric acid, and calcium chloride.

ZnO _____ 11
H$_3$PO$_4$ (75% by weight) _____ 48
CaCl$_2$ _____ 15
Water _____ 50

For processing this solution is likewise diluted with water to form a 4% solution. It gives a satisfactory rustproof coating on ferrous metal objects and by replenishing as in Example I the solution can be used over and over until the iron content of the solution reaches about 8 grams of iron per liter of solution.

These solutions can be used continuously without discarding by replenishing the zinc content and removing iron so that the concentration of iron remains below 8 grams per liter. The iron may be removed in various ways, such as by discarding some of the solution from time to time or by precipitation such as by adding H$_2$O$_2$ to convert the ferrous iron to ferric.

Example IV

The following is an example of an actual commercial run as it is being used at one of the large automotive plants. It is the so-called double or plural tank sludge free phosphate coating process.

This process involves the use of two tanks containing 3600 gallons of solution in each tank. The tanks are herein designated as tank A and tank B. The initial composition of tank A, that is, before the introduction of any of the ferrous metal objects, consisted of zinc dihydrogen phosphate, phosphoric acid, zinc chloride, and ferrous chloride. The free acid ($H_3PO_4$) had a concentration of .019 N. The total acid was .15 N, giving a ratio of free acid to total acid of 1:7.9. The zinc was present in 2.3 grams per liter, the ferrous iron in 2.7 grams per liter, and the chloride in 2.5 grams per liter. 1000 lbs. of nuts and bolts having a surface area of 1000 sq. ft. were immersed in this solution at 205° F. for 20 minutes. At the end of 20 minutes the solution was .011 N. in free acid. It had a total acidity of .13 N. and a ratio of free acid to total acid of 1:11.8. The zinc content was 1.2 grams per liter, ferrous iron 3.0 grams per liter, and chloride 2.5 grams per liter.

At the end of 20 minutes the nuts and bolts were removed from tank A and placed in tank B. The initial solution in tank B contained zinc dihydrogen phosphate, phosphoric acid, zinc chloride, and ferrous chloride. It had a free acid concentration (phosphoric acid) of .05 N., a total acidity of .24 N. and a ratio of free acid to total acid of 1:4.8, zinc content is 5.9 grams per liter, iron 1.5 grams per liter, and chloride 2.5 grams per liter. The work is allowed to remain in the solution for 20 minutes, and at the end of this time the free acid is .047 N., the total acid .219 N., and the ratio of free acid to total acidity 1:4.3. The zinc content is 5.4 grams per liter, iron 2 grams per liter, and chloride 2.5 grams per liter.

New loads are added every 20 minutes for 8 hours. At the end of 8 hours 25% of the solution of tank A are drawn off and discarded, and 25% of the solution of tank B are added to tank A. 30 gallons of replenishing solution are added to tank B and water added to bring it to its original volume. This replenishing solution is made by forming a solution of the following ingredients in the parts by weight indicated:

| | |
|---|---|
| ZnO | 8.7 |
| $H_3PO_4$ (75% by weight) | 51.2 |
| $ZnCl_2$ | 22.7 |
| Water | 17.4 |

The above process gives a satisfactory phosphate rustproof coating for automobile use. The solutions remain sludge free throughout the processing, giving desirable cleanliness and ease of operation which is not present with the sludge containing solutions heretofore used.

In an improvement on this process sodium nitrate is added to the replenishing solution, viz., 2 parts by weight. This causes more iron to coat on the work and makes it unnecessary to discard any solution.

The prefered way of making up my concentrated phosphate replenishing composition is to dissolve zinc oxide and zinc chloride in phosphoric acid, using just sufficient water to hold the reaction products in solution. The acid is preferably used in amount sufficient to produce in the solution a ratio of free acid to total acid of between 1:5 and 1:10. Suitable concentrations of acid may be determined by titrating a 2 ml. sample of the concentrated solution diluted with cold water to, for example, 25 times its original volume. The 2 ml. sample is titrated for free acid with $1/50$ normal sodium hydroxide solution, using methyl orange as an indicator, and then titrated for total acid in the same way, using phenolphthalein. The free acid and total acid is expressed as ml. of NaOH used in the titration.

Instead of dissolving zinc oxide, I may use zinc metal, zinc carbonate, normal zinc phosphate, or other zinc compounds that react with phosphoric acid to give zinc dihydrogen phosphate.

Bromide ion and iodide ion function in a similar manner to the chloride radical and may be used in my process in place of the chloride radical.

The invention is also applicable to the coating of other metals besides iron and steel, and alloy steels. It may, for example, be used for applying phosphate coatings to zinc, cadmium, and alloys therefor, particularly when an oxidizing agent such as nitrate or chlorate is present.

While I have described certain prefered embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. A non-oxidizing phosphate coating composition consisting of an aqueous solution consisting essentially of zinc dihydrogen phosphate, phosphoric acid, zinc chloride, water, and ferrous chloride, the chloride in excess of the chloride equivalent to the chloride of the zinc chloride being present in solution in at least 1 gram of chloride per 10 grams of zinc dihydrogen phosphate, the solution having a free acid to total acid ratio of between 1:5 and 1:10, a pH of between 2.2 and 3.0, a zinc concentration of at least .001 mol per liter and a phosphate concentration of at least .003 mol per liter.

2. A non-oxidizing phosphate coating composition consisting of an aqueous solution consisting essentially of zinc dihydrogen phosphate, phosphoric acid, zinc chloride, water, and manganous chloride, the chloride in excess of the chloride equivalent to the chloride of the zinc chloride being present in solution in at least 1 gram of chloride per 10 grams of zinc dihydrogen phosphate, the solution having a free acid to total acid ratio of between 1:3.5 and 1:20, a pH of between 1.5 and 4.0, a zinc concentration of at least .001 mol per liter and a phosphate concentration of at least .003 mol per liter.

3. A non-oxidizing phosphate coating composition consisting of an aqueous solution consisting essentially of zinc dihydrogen phosphate, phosphoric acid, zinc chloride, water, and manganous chloride, the chloride in excess of the chloride equivalent to the chloride of the zinc chloride being present in solution in at least 1 gram of chloride per 10 grams of zinc dihydrogen phosphate, the solution having a free acid to total acid ratio of between 1:5 and 1:10, a pH of between 2.2 and 3.0, a zinc concentration of at least .001 mol per liter and a phosphate concentration of at least .003 mol per liter.

4. The method of coating ferrous metal surfaces which comprises immersing a ferrous metal surface into a solution consisting essentially of zinc dihydrogen phosphate, phosphoric acid, zinc chloride, water, and ferrous chloride, the chloride in excess of the chloride equivalent to the chloride of the zinc chloride being present in solution in at least 1 gram of chloride radical per 10 grams of zinc dihydrogen phosphate, the solution having a free acid to total acid ratio of between 1:5 and 1:10, a pH of between 2.2 and 3.0, a zinc concentration of at least .001 mol per liter and a phosphate concentration of at least .003 mol per liter.

5. The method of coating ferrous metal surfaces which comprises immersing a ferrous metal surface into a solution consisting essentially of zinc dihydrogen phosphate, phosphoric acid, zinc chloride, water, and manganous chloride, the chloride in excess of the chloride equivalent to the chloride of the zinc chloride being present in solution in at least 1 gram of chloride per 10 grams of zinc dihydrogen phosphate, the solution having a free acid to total acid ratio of between 1:3.5 and 1:20, a pH of between 1.5 and 4.0, a zinc concentration of at least .001 mol per liter and a phosphate concentration of at least .003 mol per liter.

6. The method of coating ferrous metal surfaces which comprises immersing a ferrous metal surface into a solution consisting essentially of zinc dihydrogen phosphate, phosphoric acid, zinc chloride, water, and manganous chloride, the chloride in excess of the chloride equivalent to the chloride of the zinc chloride being present in solution in at least 1 gram of chloride radical per 10 grams of zinc dihydrogen phosphate, the solution having a free acid to total acid ratio of between 1:5 and 1:10, a pH of between 2.2 and 3.0, a zinc concentration of at least .001 mol per liter and a phosphate concentration of at least .003 mol per liter.

7. A non-oxidizing phosphate coating composition consisting of an aqueous solution consisting essentially of zinc dihydrogen phosphate, phosphoric acid, zinc chloride, water, and a soluble chloride other than zinc chloride, the chloride in excess of the chloride equivalent to the chloride of the zinc chloride being present in solution in at least 1 gm. of chloride per 10 gms. of zinc dihydrogen phosphate, the solution having a free acid to total acid ratio of between 1:3.5 and 1:20, a pH of between 1.5 and 4.0, a zinc concentration of at least .001 mol. per liter and a phosphate concentration of at least .003 mol. per liter.

8. A non-oxidizing phosphate coating composition consisting of an aqueous solution consisting essentially of zinc dihydrogen phosphate, phosphoric acid, zinc chloride, water, and a soluble chloride other than zinc chloride, the chloride in excess of the chloride equivalent to the chloride of the zinc chloride being present in solution in at least 1 gm. of chloride per 10 gms. of zinc dihydrogen phosphate, the solution having a free acid to total acid ratio of between 1:5 and 1:10, a pH of between 2.2 and 3.0, a zinc concentration of at least .001 mol. per liter and a phosphate concentration of at least .001 mol. per liter and a phosphate concentration of at least .003 mol. per liter.

9. The method of coating ferrous metal surfaces which comprises immersing a ferrous metal surface into a solution consisting essentially of zinc dihydrogen phosphate, phosphoric acid, zinc chloride, water, and a soluble chloride other than zinc, the chloride in excess of the chloride equivalent to the chloride of the zinc chloride being present in solution in at least 1 gm. of chloride per 10 gms. of zinc dihydrogen phosphate, the solution having a free acid to total acid ratio of between 1:3.5 and 1:20, a pH of between 1.5 and 4.0, a zinc concentration of at least .001 mol. per liter and a phosphate concentration of at least .003 mol. per liter.

10. The method of coating ferrous metal surfaces which comprises immersing a ferrous metal surface into a solution consisting essentially of zinc dihydrogen phosphate, phosphoric acid, zinc chloride, water, and a soluble chloride other than zinc chloride, the chloride in excess of the chloride equivalent to the chloride of the zinc chloride being present in solution in at least 1 gm. of chloride radical per 10 gms. of zinc dihydrogen phosphate, the solution having a free acid to total acid ratio of between 1:5 and 1:10, a pH of between 2.2 and 3.0, a zinc concentration of at least .001 mol. per liter and a phosphate concentration of at least .003 mol. per liter.

PAUL AMUNDSEN.

REFERENCES CITED

The following references are of record in the file of this patent:

UNITED STATES PATENTS

| Number | Name | Date |
| --- | --- | --- |
| 1,514,494 | Williams | Nov. 4, 1924 |
| 1,869,121 | Thompson et al. | July 26, 1932 |
| 2,132,000 | Curtin | Oct. 4, 1938 |
| 2,137,370 | Unger | Nov. 22, 1938 |
| 2,209,291 | Witty | July 23, 1940 |
| 2,293,716 | Darsey | Aug. 25, 1942 |
| 2,314,887 | Lodeesen et al. | Mar. 30, 1943 |
| 2,316,810 | Romig | Apr. 20, 1943 |
| 2,351,605 | Gibson | June 20, 1944 |

FOREIGN PATENTS

| Number | Country | Date |
| --- | --- | --- |
| 229,196 | Switzerland | Jan. 3, 1944 |